United States Patent
Son

(10) Patent No.: US 10,551,552 B2
(45) Date of Patent: Feb. 4, 2020

(54) LIGHT-EMITTING APPARATUS AND ILLUMINATION APPARATUS INCLUDING THE SAME

(71) Applicant: LG Innotek Co., Ltd., Seoul (KR)

(72) Inventor: Chang Gyun Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 278 days.

(21) Appl. No.: 15/489,273

(22) Filed: Apr. 17, 2017

(65) Prior Publication Data

US 2017/0299798 A1   Oct. 19, 2017

(30) Foreign Application Priority Data

Apr. 15, 2016   (KR) .................. 10-2016-0045931

(51) Int. Cl.
*G02B 6/00* (2006.01)
*F21V 8/00* (2006.01)

(52) U.S. Cl.
CPC ........... *G02B 6/0055* (2013.01); *G02B 6/003* (2013.01); *G02B 6/005* (2013.01); *G02B 6/0023* (2013.01); *G02B 6/0068* (2013.01); *G02B 6/0078* (2013.01); *G02B 6/0085* (2013.01)

(58) Field of Classification Search
CPC .... G02B 6/0055; G02B 6/0023; G02B 6/003; G02B 6/005; G02B 6/0068; G02B 6/0078; G02B 6/0085
See application file for complete search history.

(56) References Cited

U.S. PATENT DOCUMENTS 8,128,272 B2 * 3/2012 Fine .................... G02B 6/0021
                                                            362/606
8,602,581 B1   12/2013 Kaihotsu

FOREIGN PATENT DOCUMENTS

| EP | 2980471 A1 | 2/2016 |
| JP | 2015108689 A | 6/2015 |
| WO | WO-2012/137126 A1 | 10/2012 |
| WO | WO-2013/128694 A1 | 9/2013 |
| WO | WO-2015/167492 A1 | 11/2015 |

OTHER PUBLICATIONS

European Search Report dated Sep. 19, 2017 in European Application No. 17166684.5.

* cited by examiner

*Primary Examiner* — Anabel Ton
(74) *Attorney, Agent, or Firm* — Saliwanchik, Lloyd & Eisenschenk

(57) ABSTRACT

A light-emitting apparatus is disclosed. The light-emitting apparatus includes at least one light guide member, at least one light source unit disposed at at least one of two opposite end portions of the light guide member, a first reflection unit disposed on a first inner surface portion of the light guide member, and a plurality of light output units disposed on a second inner surface portion of the light guide member, located opposite the first inner surface portion, while being spaced apart from each other.

20 Claims, 11 Drawing Sheets

LIGHT-EMITTING APPARATUS AND ILLUMINATION APPARATUS INCLUDING THE SAME

CROSS REFERENCE TO RELATED APPLICATION

This application claims priority under 35 U.S.C. § 119 to Korea Application No. 10-2016-0045931, filed Apr. 15, 2016, which is hereby incorporated by references in its entirety.

TECHNICAL FIELD

Embodiments relate to a light-emitting apparatus and an illumination apparatus including the same.

BACKGROUND

A light-emitting apparatus is widely used for homes, in industry, and in vehicles. For example, a halogen lamp, a high-intensity discharge (HID) lamp, a xenon lamp, and a light-emitting diode (LED) are used as a light source of a light-emitting apparatus that is mounted in a head lamp for vehicles. In addition, increasing attention is being paid to a laser diode (LD) as a next-generation light source of the light-emitting apparatus. In the case in which the LD is used for vehicles, it is possible to satisfy functional requirements, such as long-distance radiation and searchlight function, design, and efficiency. The reason for this is that the LD exhibits higher luminance than conventional light sources and occupies a smaller area than the conventional light sources and that the LD exhibits unique characteristics such as straightness and polarization. Consequently, it is expected that the LD will attract much more attention than conventional light sources in the future.

For example, a light-emitting apparatus may be applied to an illumination apparatus that is mounted to a front portion of a vehicle, for example, a day running light (DRL). The DRL is used for the purpose of reducing the incidence of traffic accidents. That is, the DRL enables pedestrians to perceive the location or presence of a traveling vehicle when the weather is rainy or dark in the daytime, thereby protecting pedestrians from collisions with the vehicle.

DRLs may be individually mounted on a front left side and a front right side of a vehicle and may be required to radiate white light. In most cases, a light-emitting diode (LED) is used for a DRL for vehicles. There is also demand for an organic light-emitting diode (OLED) as a light source of a DRL. However, an OLED is not commonly used for a DRL due to lack of reliability. A DRL also acts as a powerful means of expressing the identity of a vehicle brand.

Since a conventional light-emitting apparatus for use in a DRL employs an LED, it has a complicated structure in order to be adapted for the design of a vehicle. The reason for this is that an illumination apparatus for vehicles, specifically, an illumination apparatus used as a DRL, has a curved design rather than a straight design. Further, a conventional illumination apparatus used as a DRL has a relatively large volume because the area occupied by parts for driving a light source and the area occupied by parts for dissipating heat are relatively large.

BRIEF SUMMARY

Embodiments provide a light-emitting apparatus having improved design freedom, a simple structure and a small volume and an illumination apparatus including the same.

In one embodiment, a light-emitting apparatus may include at least one light guide member, at least one light source unit disposed at at least one of two opposite end portions of the light guide member, a first reflection unit disposed on a first inner surface portion of the light guide member, and a plurality of light output units disposed on a second inner surface portion of the light guide member, located opposite the first inner surface portion, while being spaced apart from each other.

For example, each of the plurality of light output units may include a second reflection unit disposed with facing the first reflection unit and a wavelength conversion unit disposed on the second reflection unit to convert a wavelength of light and to output converted light.

For example, the second reflection unit may have a reflectance, which has a different value in accordance with a position of one, among the plurality of light output units, in which the second reflection unit is disposed.

For example, the at least one light source unit may include at least one of a first light source unit or a second light source unit, and the reflectance of the second reflection unit included in each of the plurality of light output units may have a lower value as each of the plurality of light output units is disposed further away from the first light source unit or the second light source unit.

For example, the second reflection unit may have a predetermined transmissivity, which is as follows:

$$T_n = \left(\frac{A}{I_0 - (n-1)A}\right) \times 100,$$

in which $T_n$ is the transmissivity of the second reflection unit included in a one, among the plurality of light output units, that is located at an $n^{th}$ position away from the at least one light source unit, n is a value ranging from 1 to N ($1 \leq n \leq N$), N is a positive integer of 2 or more that refers to a number of the plurality of light output units, 'A' is a minimum quantity of light for uniformity maintenance that equals $I_0/n$, and $I_0$ is a quantity of initially incident light.

For example, the transmissivity of the second reflection unit may alternatively be as follows:

$$T_1 = \left(\frac{A}{I_0}\right) \times 100$$

$$T_m = \left(\frac{A}{I_{(m-1)}}\right) \times 100$$

$$I_{(m-1)} = (I_{(m-2)} - A)R_B - (I_{(m-2)} - A)L,$$

in which m is a value ranging from 2 to N ($2 \leq m \leq N$), $R_B$ is a reflectance of the first reflection unit, and L is a Fresnel loss.

For example, the second reflection unit may be disposed in the interior of the light guide member and the wavelength conversion unit may be disposed at the exterior of the light guide member. Alternatively, the second reflection unit may be disposed in the interior of the light guide member and the wavelength conversion unit may be disposed such that a portion thereof is disposed in the interior of the light guide member and a remaining portion thereof is disposed at the exterior of the light guide member.

For example, each of the light guide member and the second reflection unit may have elasticity.

For example, the plurality of light output units may be spaced a uniform distance apart from each other.

For example, the at least one light guide member may include a plurality of light guide members, and the light-emitting apparatus may further include an intermediate member disposed between the plurality of light guide members.

For example, the at least one light source unit may be disposed at at least one of two opposite end portions of at least one of the plurality of light guide members.

For example, the at least one light source unit may include a first light source unit disposed at a first end portion of two opposite end portions of a first light guide member, the first light guide member being one of the plurality of light guide members disposed adjacent to each other, and a second light source unit disposed at a second end portion of two opposite end portions of a second light guide member, the second light guide member being a remaining one of the plurality of light guide members disposed adjacent to each other and the second end portion of the second light guide member being located with facing the first end portion of the first light guide member. The intermediate member may include a first intermediate reflection unit reflecting light from the first light source unit and supplying the light to the first end portion of the first light guide member and a second intermediate reflection unit reflecting light from the second light source unit and supplying the light to the second end portion of the second light guide member.

For example, the distance between the plurality of light guide members may be equal to the distance between adjacent ones of the plurality of light output units disposed at each of the plurality of light guide members.

For example, the at least one light source unit may include at least one light source emitting a laser beam and at least one collimation lens collimating the laser beam and outputting a collimated beam.

For example, the at least one light source may include a plurality of light sources, the at least one collimation lens may include a plurality of collimation lenses for collimating beams emitted from the plurality of light sources, and the at least one light source unit may further include a light path conversion unit for gathering a plurality of collimated beams into a single beam.

For example, the at least one light source unit may further include a heat dissipation unit connected to the at least one light source.

For example, the at least one light source unit may emit light generated therefrom toward the first reflection unit or toward a one, among the plurality of light output units, that is located closest thereto.

In another embodiment, an illumination apparatus includes the light-emitting apparatus having the above-stated construction.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the preferred embodiments, examples of which are illustrated in the accompanying drawings. However, embodiments may be modified into various other forms. Embodiments are not restrictive but are illustrative. Embodiments are provided to more completely explain the disclosure to a person having ordinary skill in the art.

It will be understood that when an element is referred to as being "on" or "under" another element, it can be directly on/under the element, and one or more intervening elements may also be present. When an element is referred to as being "on" or "under," "under the element" as well as "on the element" can be included based on the element.

In addition, relational terms, such as "first," "second," "on/upper part/above" and "under/lower part/below," are used only to distinguish between one subject or element and another subject and element without necessarily requiring or involving any physical or logical relationship or sequence between such subjects or elements.

Figure 1A:
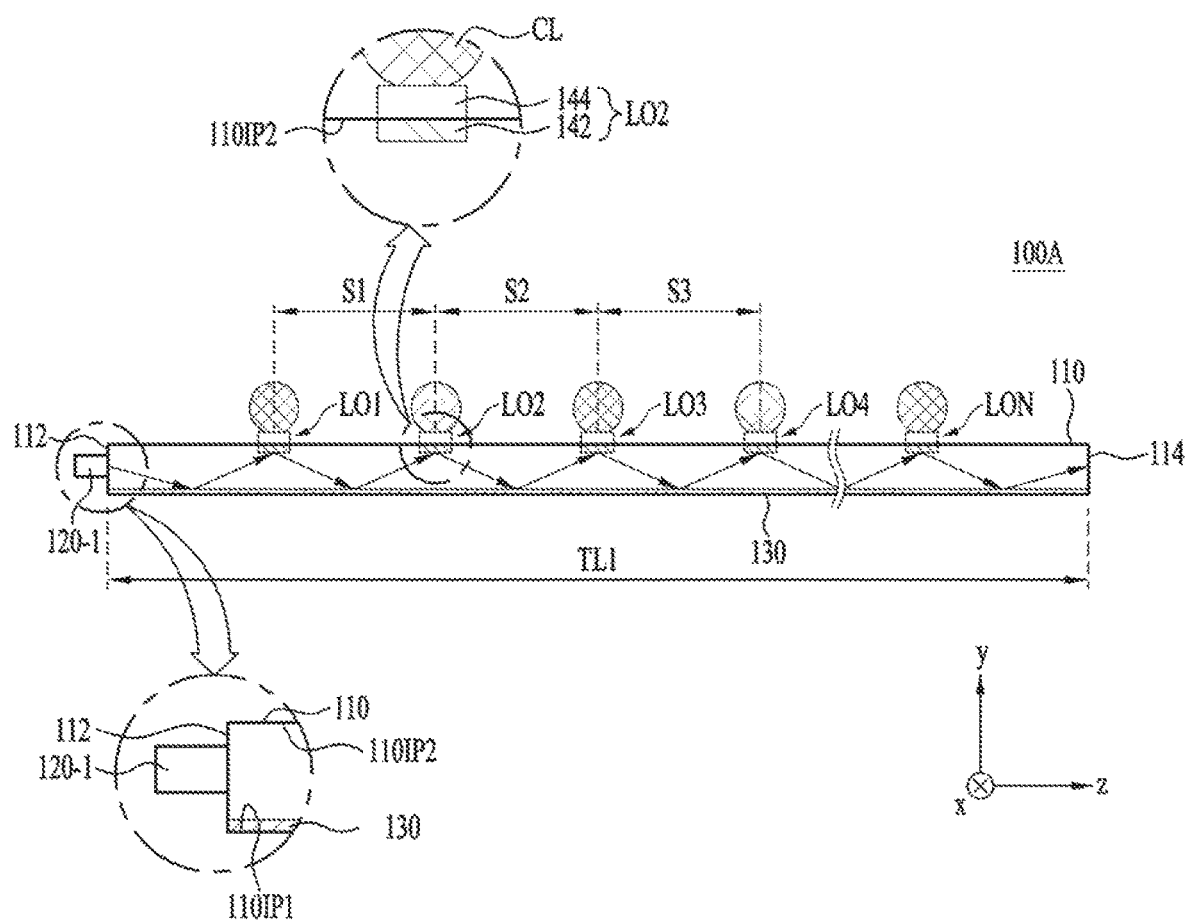
FIG. 1A is a schematic sectional view of a light-emitting apparatus according to an embodiment.
Figure 1B:
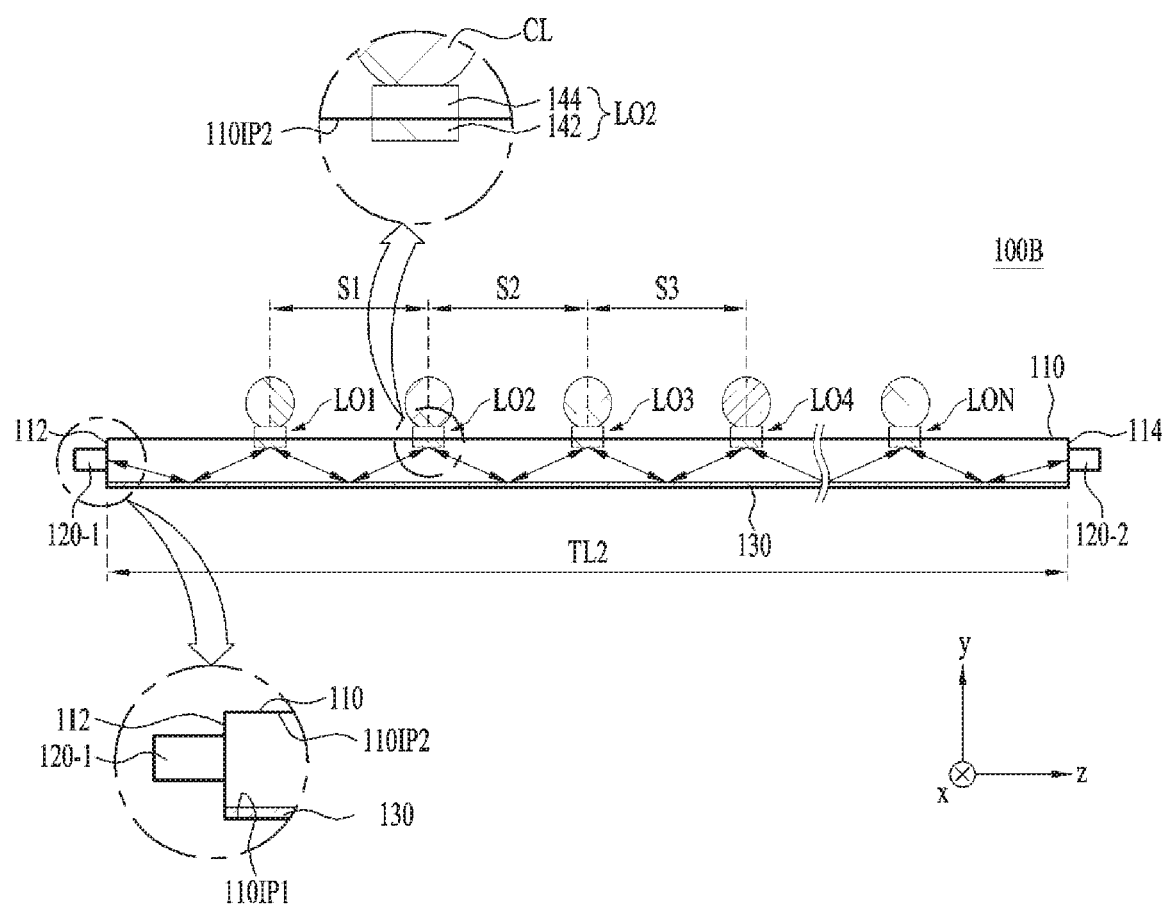
FIG. 1B is a schematic sectional view of a light-emitting apparatus according to another embodiment.

FIG. 1A is a schematic sectional view of a light-emitting apparatus 100A according to an embodiment, and FIG. 1B is a schematic sectional view of a light-emitting apparatus 100B according to another embodiment.

As shown in FIGS. 1A and 1B, the light-emitting apparatus 100A or 100B may include a light guide member 110, at least one light source unit 120 (120-1 and 120-2), a first reflection unit 130, and first to $N^{th}$ light output units LO1 to LON. Here, N is a positive integer of 2 or more.

The at least one light guide member 110 may have two end portions 112 and 114, a first inner surface portion 110IP1 and a second inner surface portion 110IP2. Here, the first inner surface portion 110IP1 and the second inner surface portion 110IP2 may be the portions that face each other. For convenience of explanation, one of the two end portions 112 and 114 will be referred to as a "first end portion" 112 and the other one will be referred to as a "second end portion" 114.

In the case of FIG. 1A, the length TL1 of the light guide member 110 may be set to be just enough for the light emitted from the first light source unit 120-1 to advance to the second end portion 114 and for the first to $N^{th}$ light output units LO1 to LON to output light of a desired intensity. In the case of FIG. 1B, the length TL2 of the light guide member 110 may be set to be just enough for the light emitted from first light source unit 120-1 to advance to the second end portion 114, for the light emitted from the second light source unit 120-2 to advance to the first end portion 112, and for the first to $N^{th}$ light output units LO1 to LON to output light of a desired intensity.

The at least one light source unit 120, as shown in FIG. 1A, may include only one light source unit 120-1, or, as shown in FIG. 1B, may include two light source units 120-1 and 120-2. Since the light-emitting apparatuses 100A and 100B illustrated in FIGS. 1A and 1B have the same construction as each other, except for the difference in the number of light source units 120, the light-emitting apparatuses 100A and 100B will be described together hereinbelow.

The first light source unit 120-1 may be disposed at the first end portion 112 of the light guide member 110, and the second light source unit 120-2 may be disposed at the second end portion 114 of the light guide member 110.

In the case in which the at least one light source unit 120 includes only one light source unit, as shown in FIG. 1A, the light source unit 120-1 may be disposed at the first end portion 112, or, unlike FIG. 1A, the light source unit 120-2 may be disposed at the second end portion 114. However, the embodiments are not limited to a specific end portion where the light source unit is disposed.

It is illustrated in FIGS. 1A and 1B for a better understanding that the first and second light source units 120-1 and 120-2 are respectively in contact with the first and second end portions 112 and 114 of the light guide member 110. However, the disclosure is not limited thereto. That is, the first and second light source units 120-1 and 120-2 may be disposed so as to be respectively spaced apart from the first and second end portions 112 and 114 of the light guide member 110.

The first and second light source units 120-1 and 120-2 may respectively emit laser beams. However, the disclosure is not limited thereto.

Hereinafter, embodiments 120A and 120B of each of the first and second light source units 120-1 and 120-2 illustrated in FIGS. 1A and 1B will be explained with reference to the accompanying drawings.

Figure 2:
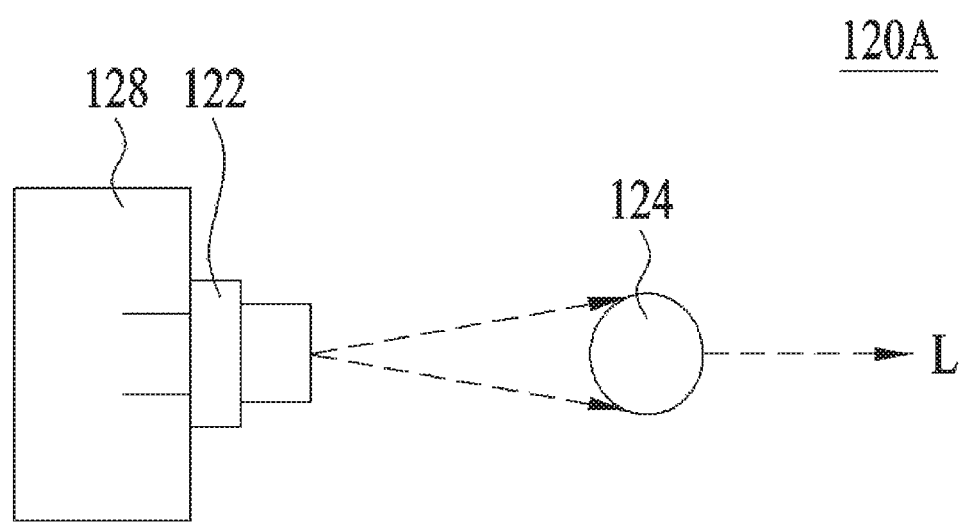
FIG. 2 is a view for explaining one embodiment of each of first and second light source units shown in FIGS. 1A and 1B.

FIG. 2 is a view for explaining one embodiment 120A of each of the first and second light source units 120-1 and 120-2 shown in FIGS. 1A and 1B.

Referring to FIG. 2, each 120A of the first and second light source units 120-1 and 120-2 may include one light source 122 and one collimation lens 124.

The light source 122 may function to emit light (hereinafter, referred to as "excitation light") and may include at least one of a light-emitting diode (LED) or a laser diode (LD). Specifically, the light-emitting apparatuses 100A and 100B according to the embodiments may employ an LD as the light source 122.

The excitation light emitted from the light source 122 may have a peak wavelength within a wavelength band ranging from 400 nm to 500 nm. However, the embodiments are not limited to a specific wavelength band of the excitation light. The light source 122 may emit excitation light having a spectral full width at half maximum (SFWHM) of 10 nm or less. This corresponds to the width of wavelength at intensity for each wavelength. However, the embodiments are not limited to a specific SFWHM. The full width at half maximum (FWHM) of the excitation light emitted from the light source 122, i.e. the size of a beam, may be 1 nm or less. However, the disclosure is not limited thereto.

The collimation lens 124 may function to focus and/or collimate the light emitted from the light source 122. To this end, the collimation lens 124 may be disposed between the light source 122 and the light guide member 110. The collimation lens 124 may collimate the laser beam and may output the collimated beam L to the first or second end portion 112 or 114 of the light guide member 110.

To this end, the collimation lens 124 may include one or more, e.g. two, aspherical lenses, cylinder lenses or diffractive optical elements (DOEs). However, the disclosure is not limited thereto.

Each 120A of the first and second light source units 120-1 and 120-2 may further include a heat dissipation unit 128. The heat dissipation unit 128 may function to dissipate heat generated from the light source 122 to the outside and may therefore include a heat dissipation material.

In the case of FIG. 2, only one light source 122 and one collimation lens 124 are illustrated. However, the disclosure is not limited thereto.

Figure 3:
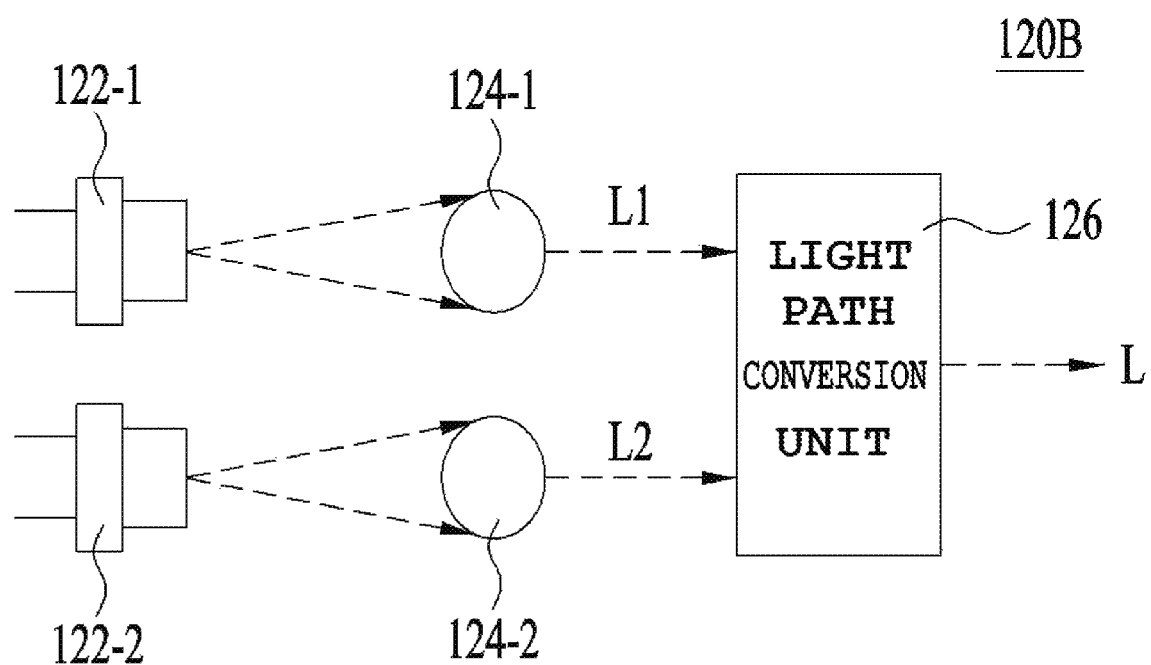
FIG. 3 is a view for explaining another embodiment of each of the first and second light source units shown in FIGS. 1A and 1B.

FIG. 3 is a view for explaining another embodiment 120B of each of the first and second light source units 120-1 and 120-2 shown in FIGS. 1A and 1B.

In the case of FIG. 3, each 120B of the first and second light source units 120-1 and 120-2 may include first and second light sources 122-1 and 122-2, first and second collimation lenses 124-1 and 124-2, and a light path conversion unit 126. However, the embodiments are not limited to a specific number of the light source units and a specific number of the collimation lenses. That is, according to an another embodiment, each of the first and second light source units 120-1 and 120-2 may alternatively include more than 2 light sources and more than 2 collimation lenses.

Each of the first and second light sources 122-1 and 122-2, like the light source 122 illustrated in FIG. 2, functions to emit light (e.g. a laser beam). Although not illustrated in FIG. 3, a heat dissipation unit (not shown) may be disposed at each of the first and second light sources 122-1 and 122-2, like FIG. 2.

The first collimation lens 124-1 may collimate the light emitted from the first light source 122-1 and may output a first collimated beam L1. Similarly, the second collimation lens 124-2 may collimate the light emitted from the second light source 122-2 and may output a second collimated beam L2. The number of light sources and the number of collimation lenses may be equal.

The light path conversion unit 126 functions to gather a plurality of collimated beams into a single beam. In the case of FIG. 3, the light path conversion unit 126 functions to gather the first and second collimated beams L1 and L2 respectively emitted from the first and second collimation lenses 124-1 and 124-2 into a single beam L.

Figure 4A:
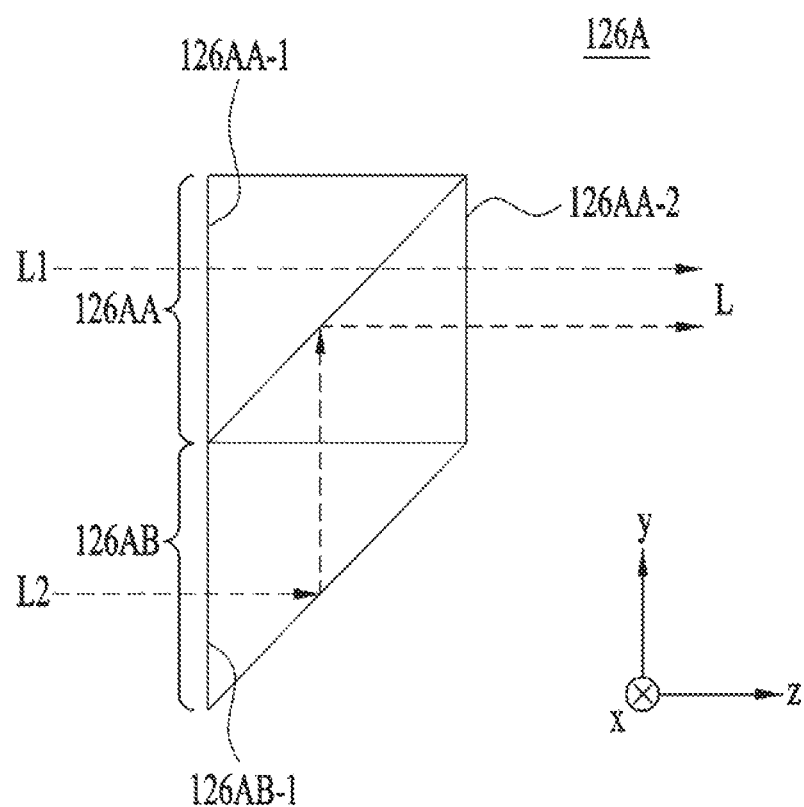
FIGS. 4A to 4C are sectional views of various embodiments of a light path conversion unit illustrated in FIG. 3.
Figure 4B:
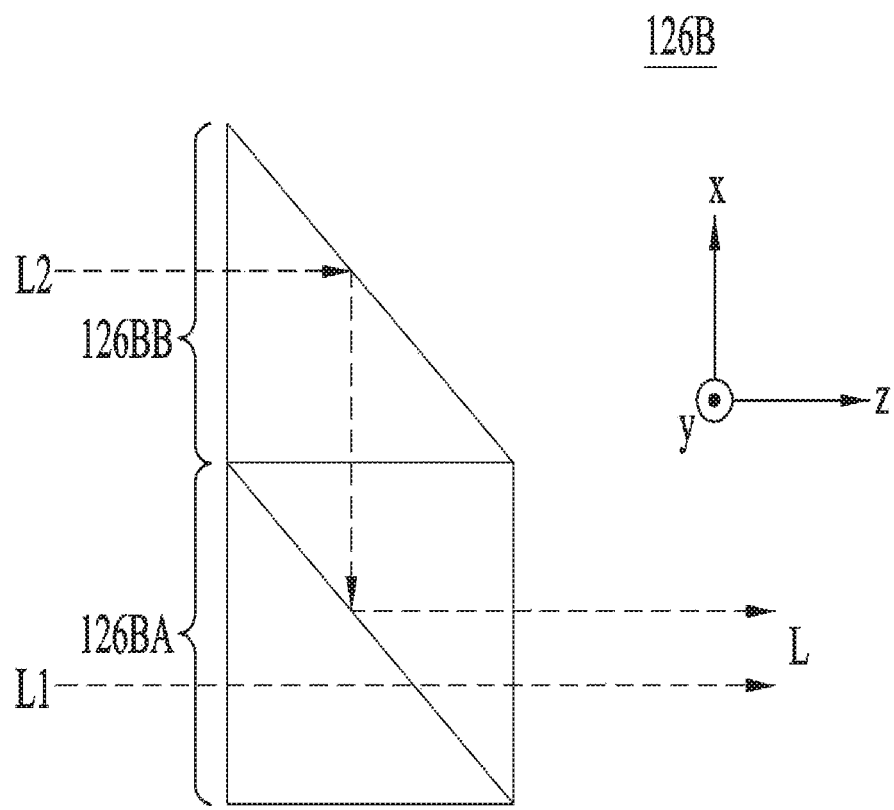
Figure 4C:
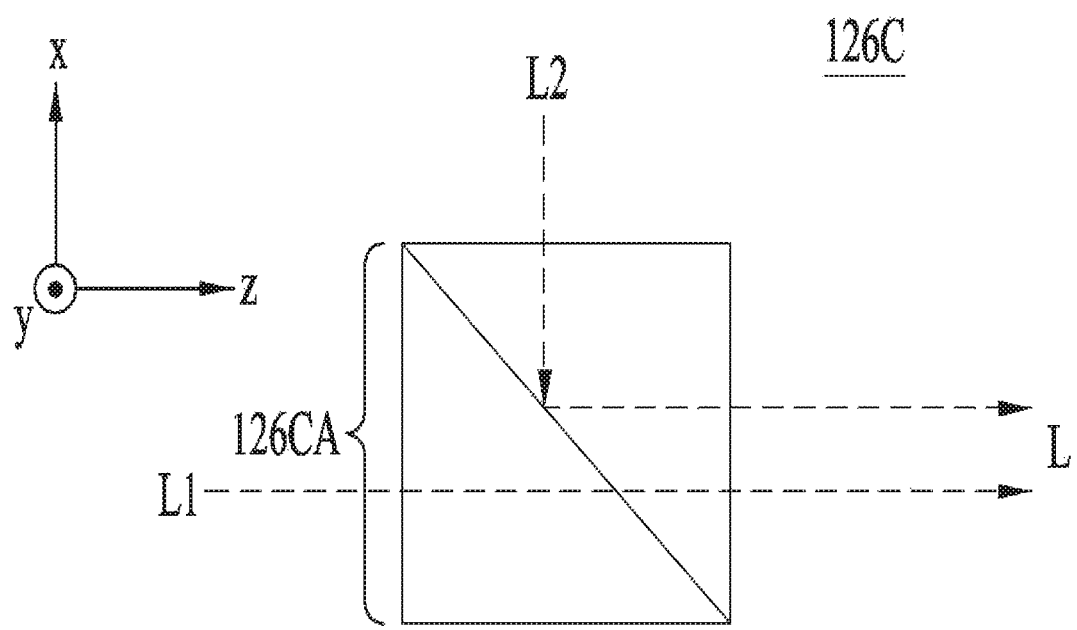

FIGS. 4A to 4C are sectional views respectively showing various embodiments 126A to 126C of the light path conversion unit 126 illustrated in FIG. 3.

In the case in which the first and second light sources 122-1 and 122-2 are arranged vertically or horizontally, the light path conversion unit 126A or 126B shown in each of FIGS. 4A and 4B may include a light transmission and reflection unit 126AA or 126BA and a prism 126AB or 126BB.

In the case in which the first and second light sources 122-1 and 122-2 are arranged vertically, as shown in FIG. 4A, the first collimated beam L1 output from the first collimation lens 124-1 is incident on the light transmission and reflection unit 126AA in a first direction (for example, in the z-axis direction), and the second collimated beam L2 output from the second collimation lens 124-2 is incident on the prism 126AB in a direction parallel to the first direction. At this time, the prism 126AB reflects the second collimated beam L2 into a second direction (for example, in the y-axis direction), which is perpendicular to the first direction. The light transmission and reflection unit 126AA transmits the first collimated beam L1 into the first direction and reflects the second collimated beam L2, which has been reflected by the prism 126AB, into the first direction. As a result, a single beam L in the first direction may be output from the light path conversion unit 126A. The first collimated beam L1 may advance in a TM mode, and the second collimated beam L2 may advance in a TE mode. In addition, the transmissivity of the first collimated beam L1 may be 95% or more, and the reflectance of the second collimated beam L2 may be 95% or more. However, the disclosure is not limited thereto.

In the case in which the first and second light sources 122-1 and 122-2 are arranged horizontally, as shown in FIG. 4B, the prism 126BB reflects the second collimated beam L2, incident thereon in the direction parallel to the first direction, in which the first collimated beam L1 is incident thereon, into a direction perpendicular to the first and second directions (for example, in the x-axis direction; hereinafter, referred to as a "third direction"). At this time, the light transmission and reflection unit 126BA transmits the first collimated beam L1 in the first direction and reflects the second collimated beam L2, which has been reflected in the third direction by the prism 126BB, in the first direction. As a result, a single beam L is output.

However, in the case in which the first and second light sources 122-1 and 122-2 are arranged neither vertically nor horizontally but intersect each other, as shown in FIG. 4C, the light path conversion unit 126C may include only a light transmission and reflection unit 126CA. Referring to FIG. 4C, the light transmission and reflection unit 126CA transmits the first collimated beam L1 in the first direction and reflects the second collimated beam L2, which is incident thereon in the third direction, into the first direction. As a result, a single beam L is output.

In order to perform the above operation, the light transmission and reflection unit 126AA, 126BA or 126CA shown in each of FIGS. 4A to 4C may include a polarization beam splitter (PBS) or a double refraction material such as calcite. However, as long as a plurality of beams may be gathered into a single beam, the embodiments are not limited to a specific material of the light transmission and reflection unit 126AA, 126BA or 126CA.

In the case in which the light transmission and reflection unit 126AA, 126BA or 126CA shown in each of FIGS. 4A to 4C is embodied as a PBS, each of an incidence surface 126AA-1 and an exit surface 126AA-2 of the PBS and an incidence surface 126AB-1 of the prism 126AB may be coated with an anti reflector (AR). However, the disclosure is not limited thereto. For example, the anti reflector may have a reflectance of 0.5% or less.

In addition, the y-axis length of the incidence surface (for example, 126AA-1 shown in FIG. 4A) of the PBS 126AA or 126BA shown in each of FIGS. 4A and 4B and the y-axis length of the incidence surface (for example, 126AB-1 shown in FIG. 4A) of the prism 126AB or 126BB may be the same. Furthermore, the y-axis vertical length and the z-axis horizontal length of the PBS 126AA, 126BA or 126CA may be the same. Alternatively, the x-axis vertical length and the z-axis horizontal length of the PBS 126CA may be the same.

In addition, at least one of the first or second light source unit 120-1 or 120-2 may not output the light emitted therefrom to the light output unit directly, but may output the light to the light output unit via the first reflection unit 130. For example, as shown in FIGS. 1A and 1B, the first light source unit 120-1 may not output the light emitted therefrom to the first light output unit LO1 directly, but may output the light to the first light output unit LO1 via the first reflection unit 130. Further, the second light source unit 120-2 may not output the light emitted therefrom to the $N^{th}$ light output unit LON directly, but may output the light to the $N^{th}$ light output unit LON via the first reflection unit 130.

Meanwhile, the first reflection unit 130 may be disposed on the first inner surface portion 110IP1 of the light guide member 110. As indicated by the arrows in FIGS. 1A and 1B, the light, which is emitted from the first and second light source units 120-1 and 120-2 and is incident on the light guide member 110, may be reflected by the first reflection unit 130 and may advance to the first to $N^{th}$ light output units LO1 to LON.

The first reflection unit 130 may include a reflective material having a reflectance of 98% or more. However, the embodiments are not limited to a specific material and a specific reflectance of the first reflection unit 130. The first reflection unit 130 may be coated on the first inner surface portion 110IP1 of the light guide member 110 or may be adhered to the first inner surface portion 110IP1 of the light guide member 110 by means of an adhesive agent. Further, the reflectance of the first reflection unit 130 may be determined by adjusting at least one of the thickness or the material of the first reflection unit 130.

Meanwhile, the first to $N^{th}$ light output units LO1 to LON may be disposed with being spaced apart from each other and on the second inner surface portion 110IP2, which is located opposite the first inner surface portion 110IP1, of the light guide member 110. The distances S1, S2 and S3 between adjacent ones of the first to $N^{th}$ light output units LO1 to LON may be uniform or may be different from each other.

Hereinafter, each of the first to $N^{th}$ light output units LO1 to LON will be explained with reference to FIGS. 1A and 1B.

As shown in FIGS. 1A and 1B, one embodiment of each of the first to N light output units LO1 to LON may include a second reflection unit 142 and a wavelength conversion unit 144.

The second reflection unit 142 is disposed so as to face the first reflection unit 130. The second reflection unit 142 functions to reflect the light, incident thereon after being reflected by the first reflection unit 130, or the light, directly incident thereon from the first or second light source unit 120-1 or 120-2 without being reflected by the first reflection unit 130, and to transmit the light to the wavelength conversion unit 144. That is, the second reflection unit 142 of the first light output unit LO1 functions to reflect the light, incident thereon after being emitted from the first light source unit 120-1 and being reflected by the first reflection unit 130, or the light, directly incident thereon from the first light source unit 120-1 without being reflected by the first reflection unit 130. Further, the second reflection unit 142 of the $N^{th}$ light output unit LON functions to reflect the light, incident thereon after being emitted from the second light source unit 120-2 and being reflected by the first reflection unit 130, or the light, directly incident thereon from the second light source unit 120-2 without being reflected by the first reflection unit 130. Furthermore, the second reflection unit 142 of each of the second to $(N-1)^{th}$ light output units LO2 to LO(N-1) functions to reflect the light, incident thereon after being reflected by the first reflection unit 130.

At this time, the second reflection unit 142 does not reflect 100% of the light incident thereon. That is, the second reflection unit 142 may reflect a portion of the light incident thereon and may transmit a remaining portion of the light.

Further, the wavelength conversion unit 144 of each of the first to $N^{th}$ light output units LO1 to LON is disposed on the second reflection unit 142. The wavelength conversion unit 144 converts the wavelength of the light that has passed through the second reflection unit 142 and outputs light CL having a converted wavelength (hereinafter, referred to as "converted light"). At this time, the wavelength conversion unit 144 cannot convert the wavelengths of all excitation light. That is, a portion of the light that is output from the wavelength conversion unit 144 may correspond to converted light, the wavelength of which has been converted, and a remaining portion of the light that is output from the wavelength conversion unit 144 may be light, the wavelength of which has not been converted.

The wavelength of the light that has passed through the second reflection unit 142 is converted by the wavelength conversion unit 144, with the result that white light or light having a desired color temperature may be output from the light-emitting apparatus 100A or 100B. To this end, the wavelength conversion unit 142 may include at least one selected from a phosphor, such as a ceramic phosphor, a lumiphore, or a YAG single-crystal. The lumiphore may be a luminescent material or a structure including a luminescent material.

In addition, light having a desired color temperature may be output from the light-emitting apparatus 100A or 100B by adjusting at least one selected from among the concentration, the particle size, and the particle size distribution of various ingredients included in the wavelength conversion unit 144, the thickness of the wavelength conversion unit 144, and the surface roughness of, or presence of or the number of air bubbles in, the wavelength conversion unit 144. For example, the wavelength conversion unit 144 may convert the wavelength band of light such that it falls within the color temperature range from 3000K to 9000K. That is, converted light having a wavelength converted by the wavelength conversion unit 144 may fall within the color temperature range from 3000K to 9000K. However, the disclosure is not limited thereto.

The wavelength conversion unit 144 may be of various types. For example, the wavelength conversion unit 144 may be of a phosphor-in-glass (PIG) type, a poly crystalline type (or a ceramic type), or a single crystalline type.

Further, the reflectance of the second reflection unit 142 may vary in accordance with the position of the corresponding one of the first to $N^{th}$ light output units LO1 to LON, in which the second reflection unit 142 is included. For example, the second reflection unit 142 may have lower reflectance as the corresponding one of the first to $N^{th}$ light output units LO1 to LON, in which the second reflection unit 142 is included, is disposed further away from the first or second light source unit 120-1 or 120-2. That is, the reflectance of the second reflection unit 142, which is included in the light output unit (for example, LO1 or LON) located relatively close to the first or second light source unit 120-1 or 120-2, may be higher than the reflectance of the second reflection unit 142, which is included in the light output unit (for example, LO(N/2)) located relatively far from the first or second light source unit 120-1 or 120-2. The purpose of this is to ensure the light uniformity of the light-emitting apparatus 100A or 100B by enabling the intensity of light, which has passed through the second reflection unit 142 of each of the first to $N^{th}$ light output units LO1 to LON, to be uniform over all of the light output units LO1 to LON.

Further, the reflectance of the second reflection unit 142 may be changed by adjusting at least one of the thickness or the material of the second reflection unit 142.

The transmissivity of the second reflection unit 142, which is included in each of the first to $N^{th}$ light output units LO1 to LON, may be expressed by the following Equation 1.

$$T_n = \left(\frac{A}{I_0 - (n-1)A}\right) \times 100 \qquad [\text{Equation 1}]$$

Here, $T_n$ refers to the transmissivity of the second reflection unit 142, which is located at an $n^{th}$ position ($1 \leq n \leq N$) away from at least one light source unit 120, for example, the first light source unit 120-1 shown in FIG. 1A or the first or second light source unit 120-1 or 120-2 shown in FIG. 1B. 'A' refers to the minimum quantity of light for uniformity maintenance, which may be expressed by the following Equation 2.

$$A = \frac{I_0}{n} \qquad [\text{Equation 2}]$$

Here, $I_0$ refers to the quantity of initially incident light. The minimum quantity of light for uniformity maintenance A may be the minimum quantity of light that is required in order to maintain the uniformity of light emitted from the light-emitting apparatus 100A or 100B.

As indicated by the arrows in FIGS. 1A and 1B, in the case in which the light that is emitted from the first and second light source units 120-1 and 120-2 and is incident on the light guide member 110 does not advance to the light output unit LO1 directly, but advances to the light output unit LO1 after being reflected by the first reflection unit 130, $I_0$ may be expressed by the following Equation 3.

$$I_0 = R_B \times 100\% \qquad [\text{Equation 3}]$$

Here, $R_B$ refers to the reflectance of the first reflection unit 130.

The transmissivity of the second reflection unit 142, which is expressed by the above Equation 1, is a value determined without consideration of the reflectance $R_B$ of the first reflection unit 130 or of the Fresnel loss L. However, if the reflectance $R_B$ and the Fresnel loss L are considered, the transmissivity of the second reflection unit 142 included in each of the first to $N^{th}$ light output units LO1 to LON may be expressed by the following Equation 4.

$$T_1 = \left(\frac{A}{I_0}\right) \times 100 \qquad [\text{Equation 4}]$$

$$T_m = \left(\frac{A}{I_{(m-1)}}\right) \times 100$$

Here, m is a value ranging from 2 to N ($2 \leq m \leq N$), and $I_{(m-1)}$ may be expressed by the following Equation 5.

$$I_{(m-1)} = (I_{(m-2)} - A)R_B - (I_{(m-2)} - A)L \qquad [\text{Equation 5}]$$

The above Equations 1 to 5 for determining the transmissivity of the second reflection unit 142 of each of the first to $N^{th}$ light output units LO1 to LON may be identically applied to the determination based on the first light source unit 120-1 and the determination based on the second light source unit 120-2.

The luminance of the light emitted from the entire of the light-emitting apparatus 100A or 100B may be determined in accordance with the transmissivity of the second reflection unit 142 included in each of the first to $N^{th}$ light output units LO1 to LON. That is, the lower the transmissivity becomes, the lower the intensity of the light emitted from the entire of the light-emitting apparatus 100A or 100B becomes. Therefore, at least one of the z-axis length TL1 or TL2 of the light guide member 110, the distance (or the pitch) S1, S2, or S3 between adjacent ones of the first to $N^{th}$ light output units LO1 to LON, or the total number N of first to $N^{th}$ light output units LO1 to LON may be determined based on the transmissivity.

Each of the light-emitting apparatuses 100A and 100B according to the embodiments illustrated in FIGS. 1A and 1B includes a single light guide member 110. However, the disclosure is not limited thereto. That is, according to another embodiment, the light-emitting apparatus may alternatively include a plurality of light guide members.

Hereinafter, light-emitting apparatuses 100C, 100D, and 100E according to further embodiments, each including two light guide members, will be described. The following description may also be applicable to a light-emitting apparatus including more than 2 light guide members.

Figure 5:
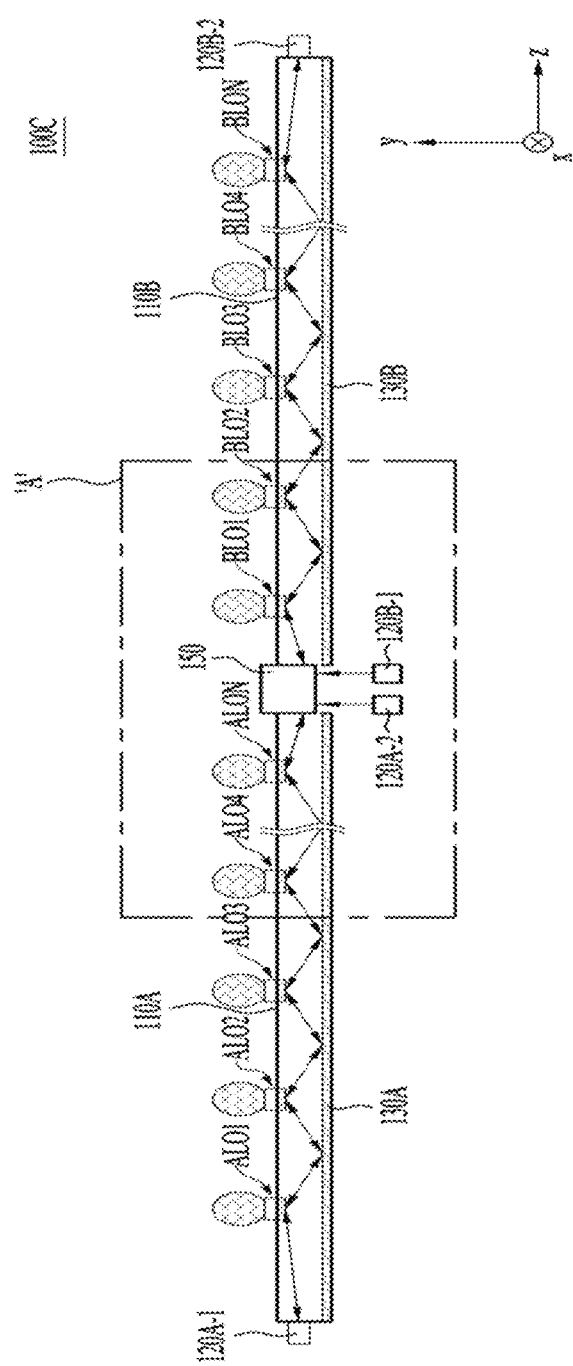
FIG. 5 is a sectional view of a light-emitting apparatus according to still another embodiment.

FIG. 5 is a sectional view of a light-emitting apparatus 100C according to still another embodiment.

The light-emitting apparatus 100C shown in FIG. 5 may include a $1^{st}$ light guide member 110A, a $1-1^{st}$ light source unit 120A-1, a $1-2^{nd}$ light source unit 120A-2, a $1-1^{st}$ reflection unit 130A, $1-1^{st}$ to $(1-N)^{th}$ light output units ALO1 to ALON, a $2^{nd}$ light guide member 110B, a $2-1^{st}$ light source unit 120B-1, a $2-2^{nd}$ light source unit 120B-2, a $2-1^{st}$ reflection unit 130B, $2-1^{st}$ to $(2-N)^{th}$ light output units BLO1 to BLON and an intermediate member 150.

Since the $1^{st}$ light guide member 110A, the $1-1^{st}$ light source unit 120A-1, the $1-2^{nd}$ light source unit 120A-2, the $1-1^{st}$ reflection unit 130A, and the $1-1^{st}$ to $(1-N)^{th}$ light output units ALO1 to ALON shown in FIG. 5 respectively correspond to the light guide member 110, the first light source unit 120-1, the second light source unit 120-2, the first reflection unit 130 and the first to $N^{th}$ light output units LO1 to LON shown in FIG. 1, a duplicate explanation thereof will be omitted.

Further, since the $2^{nd}$ light guide member 110B, the $2-1^{st}$ light source unit 120B-1, the $2-2^{nd}$ light source unit 120B-2, the $2-1^{st}$ reflection unit 130B, and the $2-1^{st}$ to $(2-N)^{th}$ light output units BLO1 to BLON shown in FIG. 5 respectively correspond to the light guide member 110, the first light source unit 120-1, the second light source unit 120-2, the first reflection unit 130, and the first to $N^{th}$ light output units LO1 to LON shown in FIG. 1, a duplicate explanation thereof will be omitted.

That is, the light-emitting apparatus 100C shown in FIG. 5 includes two light-emitting apparatuses 100B, each of which is shown in FIG. 1B, and further includes the intermediate member 150, which is disposed between the two light-emitting apparatuses 100B.

The intermediate member 150 shown in FIG. 5 is disposed between the two light guide members 110A and 110B, which are arranged adjacent to each other.

The two adjacent first and second light guide members 110A and 110B may be connected to each other via the intermediate member 150. However, the disclosure is not limited thereto. That is, according to another embodiment, the two adjacent light guide members 110A and 110B may alternatively be arranged so as to be spaced apart from each other.

Figure 6:
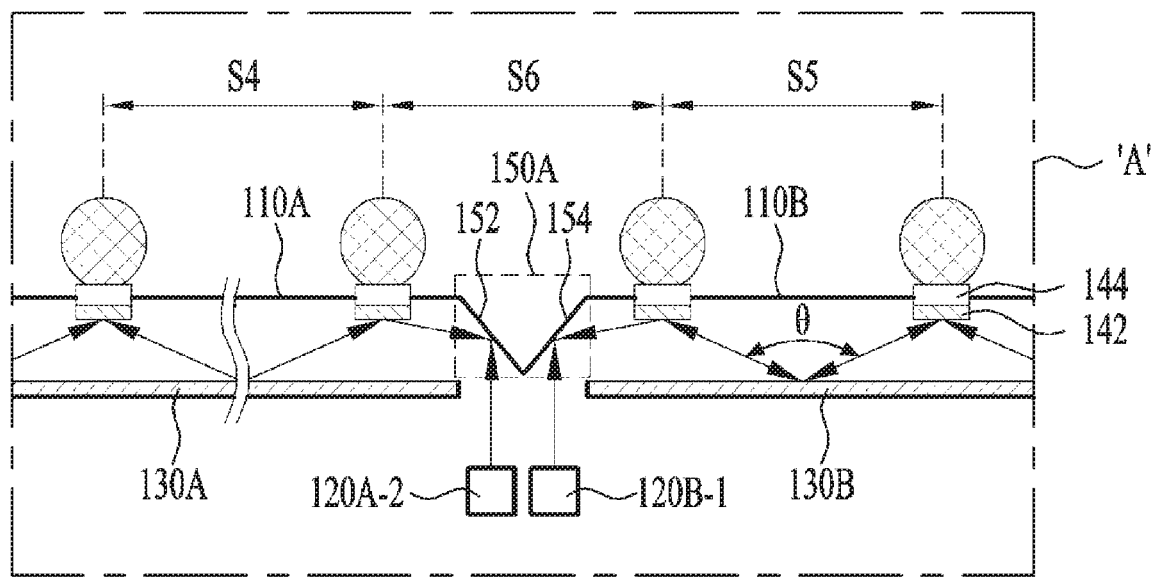
FIG. 6 is an enlarged sectional view of portion "A" in FIG. 5.

FIG. 6 is an enlarged sectional view of portion "A" in FIG. 5.

An intermediate member 150A shown in FIG. 6 corresponds to one embodiment of the intermediate member 150 shown in FIG. 5.

The intermediate member 150A may include first and second intermediate reflection units 152 and 154. The first intermediate reflection unit 152 functions to reflect light emitted from the $1-2^{nd}$ light source unit 120A-2 located adjacent to the first light guide member 110A, which is one of the plurality of light guide members, and to supply the light to the second end portion 114 of the first light guide member 110A. Further, the second intermediate reflection unit 154 functions to reflect light emitted from the $2-1^{st}$ light source unit 120B-1, located adjacent to the second light guide member 110B, which is the other one of the plurality of light guide members, and to supply the light to the first end portion 112 of the second light guide member 110B.

The first intermediate reflection unit 152 may be connected with the second end portion 114 of the first light guide member 110A, and the second intermediate reflection unit 154 may be connected with the first end portion 112 of the second light guide member 110B. If the first and second intermediate reflection units 152 and 154 are connected with each other, the first light guide member 110A and the second light guide member 110B may be connected with each other via the intermediate member 150A interposed therebetween. However, the disclosure is not limited thereto. That is, according to another embodiment, the first and second intermediate reflection units 152 and 154 may alternatively be disconnected from each other.

Meanwhile, the first to $N^{th}$ light output units LO1 to LON, ALO1 to ALON, or BLO1 to BLON may be arranged over the entire length of the light guide member 110, 110A or 110B. For example, as shown in FIGS. 1A and 1B, the second reflection unit 142 may be disposed in the interior of the light guide member 110, and the wavelength conversion unit 144 may be disposed at the exterior of the light guide member 110. That is, the entire wavelength conversion unit 144 may be exposed with protruding to the outside of the light guide member 110. However, the disclosure is not limited thereto. According to another embodiment, as shown in FIG. 6, each of the $1-2^{nd}$ and $2-2^{nd}$ reflection units 142 may be disposed in the interior of a respective one of the first and second light guide members 110A and 110B, and the wavelength conversion unit 144 may be disposed such that a portion thereof is disposed in the interior of each of the first and second light guide members 110A and 110B and a remaining portion thereof is disposed at the exterior of each of the first and second light guide members 110A and 110B.

Further, as shown in FIG. 6, the distance S4 between two adjacent ones of the $1-1^{st}$ to $1-N^{th}$ light output units ALO1 to ALON may be equal to the distance S5 between two adjacent ones of the $2-1^{st}$ to $2-N^{th}$ light output units BLO1 to BLON. At this time, the distance S4 or S5 may be determined in accordance with an angle θ at which light is reflected by the first reflection unit 130A or 130B.

Further, the distance S4 or S5 may be equal to the distance S6 between the first light guide member 110A and the second light guide member 110B. In the case in which the distance S6 between the plurality of light guide members is equal to each of the distances S4 and S5 between the plurality of light output units disposed at the light guide members 110A and 110B, the plurality of light output units ALO1 to ALON and BLO1 to BLON may be spaced a uniform distance apart from each other. At this time, if the second, $1-2^{nd}$ and $2-2^{nd}$ reflection units 142 have the same transmissivity, the plurality of light guide members 110A and 110B may appear to be a single light guide member.

Therefore, it is possible to realize a unitary light guide member having a relatively long length by connecting the plurality of light guide members respectively having relatively short lengths TL1 and TL2 shown in FIG. 1A or 1B. As a result, the design freedom of the light-emitting apparatuses 100A, 100B and 100C according to the embodiments may be improved.

Further, as described above, light emitted from at least one of the first, $1\text{-}1^{st}$ or $2\text{-}1^{st}$ light source unit 120-1, 120A-1 or 120B-1, or the second, $1\text{-}2^{nd}$ or $2\text{-}2^{nd}$ light source unit 120-2, 120A-2 or 120B-2 may directly advance to one, among the plurality of light output units LO1 to LON, ALO1 to ALON, and BLO1 and BLON, that is located closest to the corresponding light source unit, which emits the light, without being reflected by the first, $1\text{-}1^{st}$ or $2\text{-}1^{st}$ reflection unit 130, 130A or 130B.

For example, as shown in FIG. 5, light emitted from the $1\text{-}1^{st}$ light source unit 120A-1 may not advance to the $1\text{-}1^{st}$ reflection unit 130A but may directly advance to the $1\text{-}1^{st}$ light output unit ALO1, which is located closest to the $1\text{-}1^{st}$ light source unit 120A-1.

Further, light emitted from the $1\text{-}2^{nd}$ light source unit 120A-2 may not advance to the $1\text{-}1^{st}$ reflection unit 130A but may directly advance to the $1\text{-}N^{th}$ light output unit ALON, which is located closest to the $1\text{-}2^{nd}$ light source unit 120A-2, via the intermediate member 150.

Further, light emitted from the $2\text{-}1^{st}$ light source unit 120B-1 may not advance to the $2\text{-}1^{st}$ reflection unit 130B but may directly advance to the $2\text{-}1^{st}$ light output unit BLO1, which is located closest to the $2\text{-}1^{st}$ light source unit 120B-1, via the intermediate member 150.

Furthermore, light emitted from the $2\text{-}2^{nd}$ light source unit 120B-2 may not advance to the $2\text{-}1^{st}$ reflection unit 130B but may directly advance to the $(2\text{-}N)^{th}$ light output unit BLON, which is located closest to the $2\text{-}2^{nd}$ light source unit 120B-2.

As described above, in the case in which light is directly output to the corresponding light output unit without being reflected by the $1\text{-}1^{st}$ or $2\text{-}1^{st}$ reflection unit 130A or 130B, $I_0$ in Equation 2 may be 100%.

Figure 7:
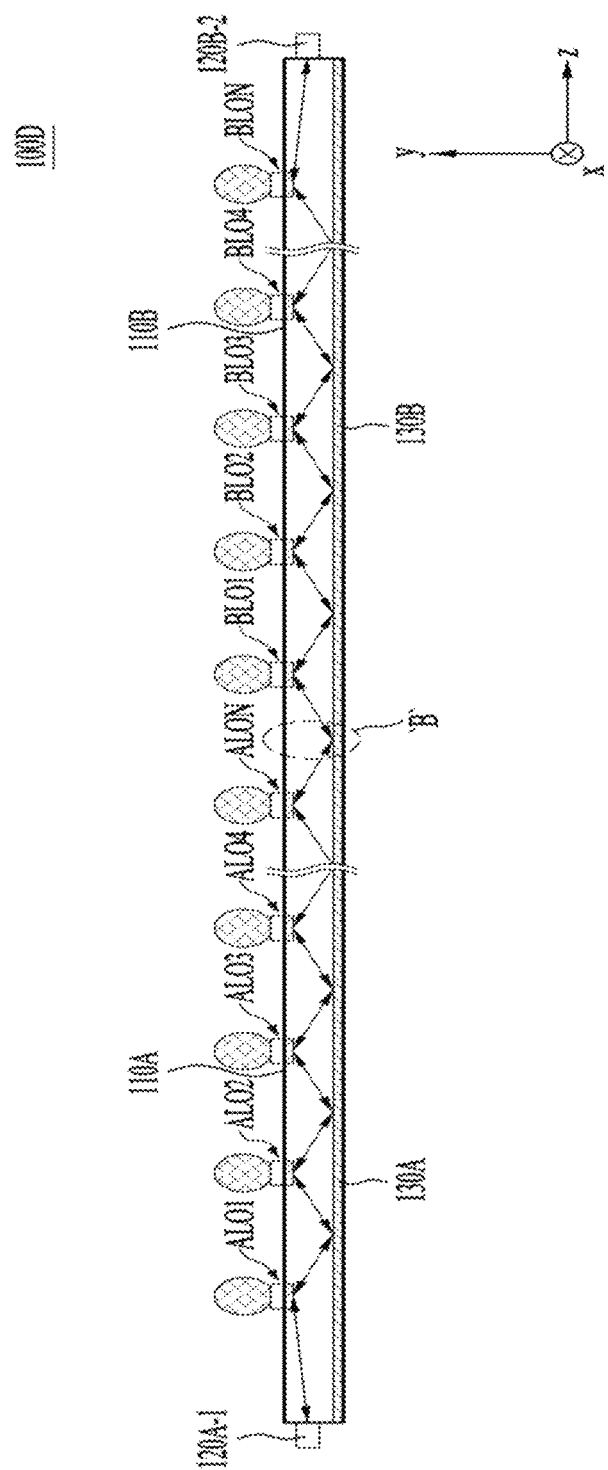
FIG. 7 is a sectional view of a light-emitting apparatus according to still another embodiment.

FIG. 7 is a sectional view of a light-emitting apparatus 100D according to still another embodiment.

Unlike the light-emitting apparatus 100C shown in FIG. 5, the light-emitting apparatus 100D shown in FIG. 7 does not include the $1\text{-}2^{nd}$ light source unit 120A-2, the $2\text{-}1^{st}$ light source unit 120B-1, and the intermediate member 150. Except for this difference, the light-emitting apparatus 100D shown in FIG. 7 has the same structure as the light-emitting apparatus 100C shown in FIG. 5. Therefore, the same parts are denoted by the same reference numerals, and a duplicate explanation thereof will be omitted.

The light-emitting apparatus 100D shown in FIG. 7 includes, a light-emitting apparatus 100A where a first light source unit 120-1 is disposed at a first end portion 112 as shown in FIG. 1A, and, a light-emitting apparatus (not shown) where a second light source unit 120-2 is disposed at a second end portion 114 unlike FIG. 1A. In this case, end portions B, of the light-emitting apparatuses, at which light source units are not disposed, may be coupled or fastened to each other. These end portions may be coupled or fastened to each other in various ways. In an example, these end portions may be coupled or fastened to each other by means of an adhesive agent (not shown) or the like. However, the disclosure is not limited thereto.

Figure 8:
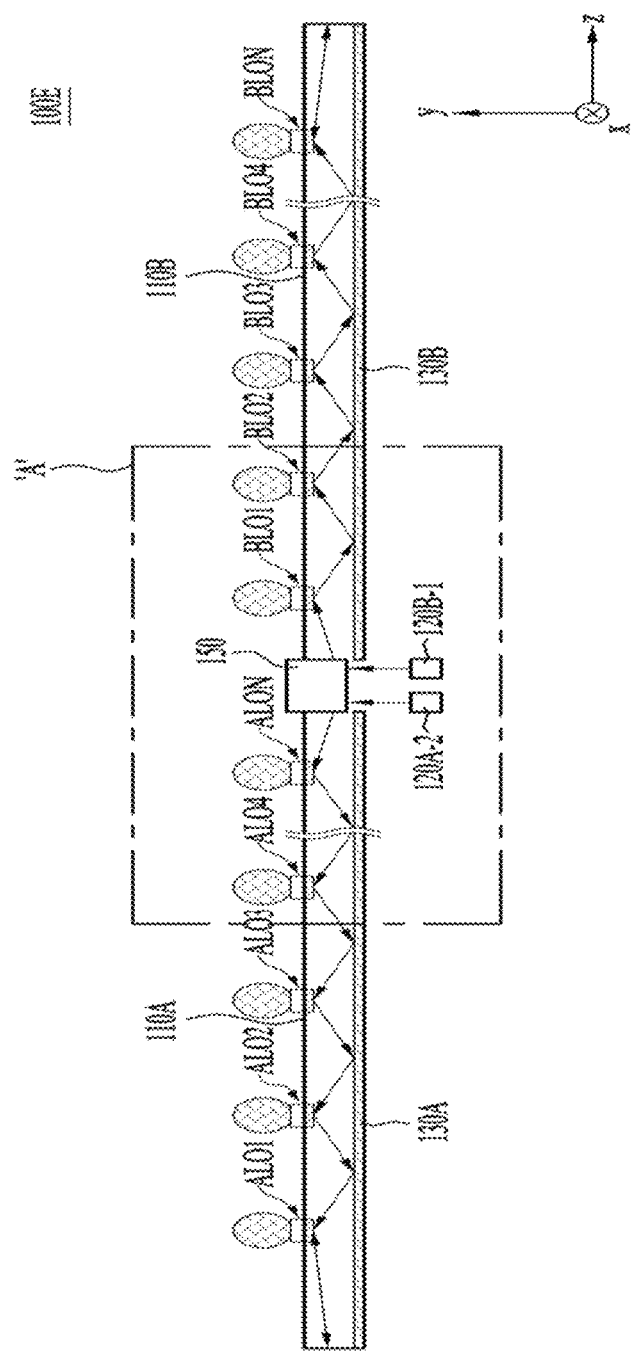
FIG. 8 is a sectional view of a light-emitting apparatus according to still another embodiment.

FIG. 8 is a sectional view of a light-emitting apparatus 100E according to still another embodiment.

Unlike the light-emitting apparatus 100C shown in FIG. 5, the light-emitting apparatus 100E shown in FIG. 8 does not include the $1\text{-}1^{st}$ light source unit 120A-1 and the $2\text{-}2^{nd}$ light source unit 120B-2. Except for this difference, the light-emitting apparatus 100E shown in FIG. 8 has the same structure as the light-emitting apparatus 100C shown in FIG. 5. Therefore, the same parts are denoted by the same reference numerals, and a duplicate explanation thereof will be omitted.

The light-emitting apparatus 100E shown in FIG. 8 includes, a light-emitting apparatus where a $1\text{-}2^{nd}$ light source unit 120A-2 is disposed such that light emitted from the $1\text{-}2^{nd}$ light source unit 120A-2 is incident through a second end portion 114 unlike FIG. 1A, and, a light-emitting apparatus where a $2\text{-}1^{st}$ light source unit 120B-1 is disposed such that light emitted from the $2\text{-}1^{st}$ light source unit 120B-1 is incident through a first end portion 112 as shown in FIG. 1A. In this case, as shown in FIG. 8, the end portions of the light-emitting apparatuses, at which the light source units 120A-2 and 120B-1 are disposed, may be connected with each other via an intermediate member 150. The intermediate member 150 may be the same as the exemplary intermediate member illustrated in FIG. 6.

The light-emitting apparatuses 100A to 100E according to the above-described embodiments may be applied to illumination apparatuses in various fields such as the vehicular field. Particularly, the light-emitting apparatuses 100A to 100E according to the embodiments may be used in illumination apparatuses for vehicles, for example, as a day running light. The illumination apparatuses for vehicles may be required to have a slim and curved shape rather than a straight shape in accordance with the design of vehicles. The light-emitting apparatuses 100A to 100E according to the embodiments shown in FIGS. 1A, 1B, 5, 7 and 8 enable the great freedom of design merely by bending the light guide members 110, 110A and 110B. Therefore, they may be effectively used in the aforementioned illumination apparatuses for vehicles. To this end, the light guide members 110, 110A and 110B and the second reflection unit 142 may be made of elastic materials. However, the embodiments are not limited to the specific materials of these 110, 110A, 110B, and 142. In addition, design freedom may be further improved when the light-emitting apparatuses 100A to 100E according to the embodiments employ LDs rather than LEDs. Furthermore, when LDs are used, the structure of the light-emitting apparatuses 100A to 100E may be simplified.

In conclusion, the light-emitting apparatuses 100A to 100E according to the embodiments, which have improved design freedom and a simple structure, may be effectively applied to illumination apparatuses for vehicles, specifically, to a day running light, and may effectively exhibit the identity of a vehicle brand.

A conventional light-emitting apparatus has a relatively large volume because it needs a plurality of light source units, which correspond in number to the number of light output units, and a plurality of heat dissipation units, which correspond in number to the number of light source units. On the other hand, in the light-emitting apparatuses according to the embodiments, the light source units are disposed only at the two opposite end portions of the light guide member, irrespective of the number of light output units. Therefore, the area occupied by the heat dissipation units for dissipating heat generated from the light source is reduced, and consequently, the overall volume of the light-emitting apparatuses 100A to 100E may be reduced. Further, the volume of the illumination apparatuses employing the light-emitting apparatuses according to the embodiments may also be reduced.

In addition, the light-emitting apparatuses 100A to 100E according to the embodiments, in which the light source units are disposed only at the two opposite end portions of the light guide member, may be simplified in structure, may be improved in productivity, and may reduce manufacturing costs.

As is apparent from the above description, in a light-emitting apparatus and an illumination apparatus including the same according to an embodiment, laser light sources are used, thereby simplifying the structure thereof. In addition, since the number of light sources is smaller than the number of light output units so that the area occupied by heat dissipation units may be reduced, the overall volume thereof may be reduced, unlike a conventional light-emitting apparatus, which includes a plurality of heat dissipation units corresponding in number to the number of light output units. In addition, since the number of light sources is smaller than that in a conventional light-emitting apparatus, the structure may be simplified, productivity may be improved, and manufacturing costs may be reduced. In addition, since a light guide member is freely variable in shape, design freedom is improved, making it possible to apply the light-emitting apparatus according to the embodiment to illumination apparatuses, for example, a DRL that need a curved design or various other designs, and to effectively exhibit the identity of a product.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light-emitting apparatus, comprising:
at least one light guide member;
at least one light source unit disposed at at least one of two opposite end portions of the light guide member;
a first reflection unit disposed on a first inner surface portion of the light guide member; and
a plurality of light output units disposed on a second inner surface portion of the light guide member, located opposite the first inner surface portion, while being spaced apart from each other,
wherein each of the plurality of light output units comprises a second reflection unit disposed facing the first reflection unit, and
wherein the light guide member has elasticity and each second reflection unit has elasticity.

2. The light-emitting apparatus according to claim 1, wherein each of the plurality of light output units includes:
a wavelength conversion unit disposed on the second reflection unit to convert a wavelength of light and to output converted light.

3. The light-emitting apparatus according to claim 2, wherein each second reflection unit has a reflectance, the reflectance having a different value in accordance with a position of the light output unit, among the plurality of light output units, in which the second reflection unit is disposed.

4. The light-emitting apparatus according to claim 3, wherein the at least one light source unit includes at least one of a first light source unit and a second light source unit, and
wherein the reflectance of the second reflection unit respectively included in each of the plurality of light output units has a lower value as each of the plurality of light output units is disposed further away from the first light source unit or the second light source unit.

5. A light-emitting apparatus, comprising:
at least one light guide member;
at least one light source unit disposed at at least one of two opposite end portions of the light guide member;
a first reflection unit disposed on a first inner surface portion of the light guide member; and
a plurality of light output units disposed on a second inner surface portion of the light guide member, located opposite the first inner surface portion, while being spaced apart from each other,
wherein each of the plurality of light output units comprises:
a second reflection unit disposed facing the first reflection unit; and
a wavelength conversion unit disposed on the second reflection unit to convert a wavelength of light and to output converted light,
wherein each second reflection unit has a reflectance, the reflectance having a different value in accordance with a position of the light output unit, among the plurality of light output units, in which the second reflection unit is disposed,
wherein the at least one light source unit includes at least one of a first light source unit and a second light source unit,
wherein the reflectance of the second reflection unit respectively included in each of the plurality of light output units has a lower value as each of the plurality of light output units is disposed further away from the first light source unit or the second light source unit,
wherein the second reflection unit has a transmissivity as follows:

$$T_n = \left(\frac{A}{I_0 - (n-1)A}\right) \times 100,$$

wherein Tn is the transmissivity of the second reflection unit included in a light output unit, among the plurality of light output units, that is located at an nth position away from the at least one light source unit, n is a value ranging from 1 to N ($1 \leq n \leq N$), N is a positive integer of 2 or more that refers to a number of the plurality of light output units, 'A' is a minimum quantity of light for uniformity maintenance that equals I0/n, and I0 is a quantity of initially incident light.

6. The light-emitting apparatus according to claim 4, wherein the second reflection unit has a transmissivity as follows:

$$T_1 = \left(\frac{A}{I_0}\right) \times 100$$

$$T_m = \left(\frac{A}{I_{(m-1)}}\right) \times 100$$

$$I_{(m-1)} = (I_{(m-2)} - A)R_B - (I_{(m-2)} - A)L,$$

wherein Tn is the transmissivity of the second reflection unit included in a light output unit, among the plurality of light output units, that is located at an nth position away from the at least one light source unit, 'A' is a minimum quantity of light for uniformity maintenance that equals I0/n, I0 is a quantity of initially incident light, m is a value ranging from 2 to N (2≤m≤N), N is a positive integer of 2 or more that refers to a number of the plurality of light output units, RB is a reflectance of the first reflection unit, and L is a Fresnel loss.

7. The light-emitting apparatus according to claim 2, wherein each second reflection unit is disposed in an interior of the light guide member and the wavelength conversion unit is disposed at an exterior of the light guide member.

8. The light-emitting apparatus according to claim 2, wherein each second reflection unit is disposed in an interior of the light guide member and the wavelength conversion unit is disposed such that a portion thereof is disposed in the interior of the light guide member and a remaining portion thereof is disposed at an exterior of the light guide member.

9. The light-emitting apparatus according to claim 1, wherein the plurality of light output units are spaced a uniform distance apart from each other.

10. A light-emitting apparatus, comprising:
at least one light guide member;
at least one light source unit disposed at at least one of two opposite end portions of the light guide member;
a first reflection unit disposed on a first inner surface portion of the light guide member; and
a plurality of light output units disposed on a second inner surface portion of the light guide member, located opposite the first inner surface portion, while being spaced apart from each other,
wherein the at least one light guide member includes a plurality of light guide members, and
wherein the light-emitting apparatus further-comprises an intermediate member disposed between light guide members of the plurality of light guide members.

11. The light-emitting apparatus according to claim 10, wherein the at least one light source unit is disposed at at least one of two opposite end portions of at least one of the plurality of light guide members.

12. The light-emitting apparatus according to claim 11, wherein the at least one light source unit includes:
a first light source unit disposed at a first end portion of two opposite end portions of a first light guide member, the first light guide member being one of the plurality of light guide members disposed adjacent to each other; and
a second light source unit disposed at a second end portion of two opposite end portions of a second light guide member, the second light guide member being a remaining one of the plurality of light guide members disposed adjacent to each other and the second end portion of the second light guide member facing the first end portion of the first light guide member, and
wherein the intermediate member includes:
a first intermediate reflection unit reflecting light from the first light source unit and supplying the light to the first end portion of the first light guide member; and
a second intermediate reflection unit reflecting light from the second light source unit and supplying the light to the second end portion of the second light guide member.

13. The light-emitting apparatus according to claim 10, wherein a distance between adjacent light guide members of the plurality of light guide members is equal to a distance between adjacent light output units of the plurality of light output units respectively disposed at each of the plurality of light guide members.

14. The light-emitting apparatus according to claim 1, wherein the at least one light source unit includes:
at least one light source emitting a laser beam; and
at least one collimation lens collimating the laser beam and outputting a collimated beam.

15. The light-emitting apparatus according to claim 14, wherein the at least one light source includes a plurality of light sources,
wherein the at least one collimation lens includes a plurality of collimation lenses collimating beams emitted from the plurality of light sources, and
wherein the at least one light source unit includes a light path conversion unit gathering a plurality of collimated beams into a single beam.

16. The light-emitting apparatus according to claim 14, wherein the at least one light source unit includes a heat dissipation unit connected to the at least one light source.

17. The light-emitting apparatus according to claim 1, wherein the at least one light source unit emits light generated therefrom toward the first reflection unit.

18. The light-emitting apparatus according to claim 1, wherein the at least one light source unit emits light generated therefrom toward a light output unit, among the plurality of light output units, that is located closest thereto.

19. An illumination apparatus, comprising:
the light-emitting apparatus according to claim 1.

20. The light-emitting apparatus according to claim 2, wherein each second reflection unit faces the first reflection unit without the wavelength conversion unit interposing therebetween.

* * * * *